US010405174B2

(12) United States Patent
Lindoff et al.

(10) Patent No.: US 10,405,174 B2
(45) Date of Patent: Sep. 3, 2019

(54) WIRELESS TERMINAL DEVICE, NETWORK NODE, METHOD AND COMPUTER PROGRAM FOR SIMULTANEOUS MULTIPLE RADIO ACCESS TECHNOLOGY OPERATION

(71) Applicant: Telefonaktiebolaget LM Ericsson (publ), Stockholm (SE)

(72) Inventors: Bengt Lindoff, Bjärred (SE); Robert Baldemair, Solna (SE); Icaro L. J. da Silva, Solna (SE); Johan Nilsson, Höllviken (SE); Andres Reial, Malmö (SE); Eliane Semaan, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 15/528,939

(22) PCT Filed: Oct. 18, 2016

(86) PCT No.: PCT/EP2016/074919
§ 371 (c)(1),
(2) Date: May 23, 2017

(87) PCT Pub. No.: WO2018/072812
PCT Pub. Date: Apr. 26, 2018

(65) Prior Publication Data
US 2018/0332465 A1    Nov. 15, 2018

(51) Int. Cl.
*H04W 8/24*        (2009.01)
*H04W 76/15*       (2018.01)
(Continued)

(52) U.S. Cl.
CPC ........... *H04W 8/24* (2013.01); *H04W 72/048* (2013.01); *H04W 72/08* (2013.01);
(Continued)

(58) Field of Classification Search
CPC ..... H04W 8/24; H04W 72/048; H04W 72/08; H04W 72/1215; H04W 76/15; H04W 88/06
See application file for complete search history.

(56) References Cited

U.S. PATENT DOCUMENTS

2009/0046596 A1 *  2/2009  Ewe .................. H04W 36/0033
                                                    370/252
2009/0234937 A1 *  9/2009  Buljore ................. H04W 24/02
                                                    709/220
(Continued)

FOREIGN PATENT DOCUMENTS

EP    2410701 A1 *  1/2012  ............ H04W 76/15
EP    2410701 A1     1/2012
(Continued)

OTHER PUBLICATIONS

IP.com search in NPL; Jul. 3, 2019 (Year: 2019).*
(Continued)

*Primary Examiner* — Benjamin H Elliott, IV
(74) *Attorney, Agent, or Firm* — Murphy, Bilak & Homiller, PLLC

(57) ABSTRACT

A wireless terminal device of a wireless communication system is arranged to operate according to a plurality of radio access technologies, RATs. A method of the wireless terminal device comprises receiving a configuration from a network node of an access network of the wireless communication system, wherein the configuration is a multi-connectivity configuration arranged to operate towards a plurality of RATs simultaneously, determining capabilities of the wireless terminal device, and analyzing the received configuration in view of the capabilities. If the capabilities are fully sufficient for the configuration, the configuration is used for setting up transceiver operation of the wireless terminal device, or if the capabilities are not fully sufficient
(Continued)

for the configuration, an adapted configuration is determined for setting up the transceiver operation of the wireless terminal device, wherein the capabilities are fully sufficient for the adapted configuration. The method also comprises operating the wireless terminal device according to selected transceiver operation. Network node, and methods and computer programs therefor are also disclosed.

10 Claims, 7 Drawing Sheets

(51) Int. Cl.
   H04W 72/04 (2009.01)
   H04W 72/08 (2009.01)
   H04W 72/12 (2009.01)
   H04W 88/06 (2009.01)

(52) U.S. Cl.
   CPC ....... H04W 72/1215 (2013.01); H04W 76/15 (2018.02); *H04W 88/06* (2013.01)

(56) References Cited

U.S. PATENT DOCUMENTS

| | | | |
|---|---|---|---|
| 2011/0216730 A1* | 9/2011 | Kim | H04L 5/0007 370/329 |
| 2013/0203459 A1* | 8/2013 | Lee | H04W 48/18 455/524 |
| 2014/0073356 A1* | 3/2014 | Siomina | G01S 5/0205 455/456.2 |
| 2015/0201427 A1* | 7/2015 | Lee | H04W 74/02 455/450 |
| 2015/0334766 A1* | 11/2015 | Lee | H04W 48/12 455/435.1 |
| 2017/0310431 A1* | 10/2017 | Iyer | H04L 1/1816 |
| 2018/0049214 A1* | 2/2018 | Kubota | H04W 72/1215 |
| 2018/0332465 A1* | 11/2018 | Lindoff | H04W 8/24 |

FOREIGN PATENT DOCUMENTS

| | | | |
|---|---|---|---|
| WO | 2010019087 A1 | 2/2010 | |
| WO | 2011087408 A1 | 7/2011 | |
| WO | WO-2011087408 A1 * | 7/2011 | ............. H04W 8/22 |
| WO | 2016119423 A1 | 8/2016 | |
| WO | WO-2018072812 A1 * | 4/2018 | ............ H04W 76/15 |

OTHER PUBLICATIONS

IP.com search in Patent; Jul. 3, 2019 (Year: 2019).*
IEEE Explore search; Jul. 3, 2019 (Year: 2019).*
Icaro Da Silva et al., "Tight Integration of New 5G Air Interface and LTE to Fulfill 5G Requirements", 2015 IEEE 81st Vehicular Technology Conference (VTC Spring 2015), Glasgow, Scotland, United Kingdom, XP002752399, May 11-14, 2015, pp. 1-5.

* cited by examiner

WIRELESS TERMINAL DEVICE, NETWORK NODE, METHOD AND COMPUTER PROGRAM FOR SIMULTANEOUS MULTIPLE RADIO ACCESS TECHNOLOGY OPERATION

TECHNICAL FIELD

The present invention generally relates to a wireless terminal device and a method for the wireless terminal device, and a computer program for implementing the method. The present invention also relates to a network node, and methods and computer program therefor. In particular, the invention relates to selecting proper transceiver operation for the wireless terminal device when operating towards a multiple of radio access technologies simultaneously.

BACKGROUND

Sometimes the term "tight integration" is used in the field of technology for the feature of different radio access technologies supporting each other or covering up for each other to provide an aggregated improved service. Tight integration aims to fulfil fifth generation (5G) wireless telecommunication user requirement (UE) such as very high data rates by user plane aggregation or ultra-reliability by user or control plane diversity. User plane aggregation is particularly efficient if New Radio (NR) and Long Term Evolution (LTE) offer similar throughput for a particular user so that the aggregation can roughly double the throughput. The occurrence of these cases will depend on the allocated spectrum, the coverage, and the load of the two accesses. Ultra reliability can be mandatory for some critical applications for which reliability and low latency are crucial to maintain.

In addition to these, it is worth to mention that the tight integration also provides enhancements to existing multi-radio access technology (RAT) features, such as load balancing and service continuity, thanks to a radio access network (RAN) level integration transparent to the core network (CN), e.g. by less signalling. In particular, service continuity will be desirable in early deployments since it can be expected that early NR deployments will provide islands of 5G coverage within a wider LTE coverage.

Multi-RAT aggregation and mobility between LTE and NR are features that are typically applied in radio resource control (RRC) "Connected" mode. However, tight integration and/or interworking, as currently called in 3GPP may also comprise interworking procedures when the UE is in a sleeping state ("Idle" mode in LTE) and/or some potentially new sleeping or low active state(s) in NR, as Third Generation Partnership Project (3GPP) is currently discussing the introduction of a state called Dormant or Connected Inactive where procedures would be similar to LTE Idle but with the UE and the network keeping some context information and re-establishing the connection via RRC Connection Resume procedure.

WO 2016/119423 A1 discloses a network connection method and device, where the method includes that a base station receives a request message, reported by a UE, for requesting a network connection, wherein the request message carries first indication information for indicating that the UE supports a multi-system tight-coupling capability, and the base station sends, based on the request message and to the UE, a configuration message for the UE to perform the network connection, wherein the configuration message carries second indication information for indicating that the UE adopts a multi-system tight-coupling manner to perform the network connection, wherein a network selection conflict may be avoided in the UE.

Thus, present solutions rely on solid knowledge at the access network node about UE capabilities, which implies requirements on corresponding signalling, e.g. as suggested by WO 2016/119423 A1. For cases where such knowledge and signalling is not feasible or desired, conflicts may still appear between network configurations and UE capabilities. It is therefore a desire to provide a solution to avoid or resolve such conflicts.

SUMMARY

The invention is based on the inventors' realization that there may be situations/scenarios where the NW node may misconfigure the UE, for instance it configures the UE with a multi-connectivity feature actually not supported by the UE. The inventors have therefore suggested an approach for handling such situations and scenarios.

According to a first aspect, there is provided a method of a wireless terminal device of a wireless communication system. The wireless terminal is arranged to operate according to a plurality of radio access technologies, RATs. The method comprises receiving a configuration from a network node of an access network of the wireless communication system, wherein the configuration is a multi-connectivity configuration arranged to operate towards a plurality of RATs simultaneously, determining capabilities of the wireless terminal device, and analysing the received configuration in view of the capabilities. If the capabilities are fully sufficient for the configuration, the configuration is used for setting up transceiver operation of the wireless terminal device, or if the capabilities are not fully sufficient for the configuration, an adapted configuration is determined for setting up the transceiver operation of the wireless terminal device, wherein the capabilities are fully sufficient for the adapted configuration. The method also comprises operating the wireless terminal device according to selected transceiver operation.

The method may comprise, if an adapted configuration is determined, transmitting information about the adapted configuration to the network node.

The capabilities may include number of receivers for different RATs of the wireless terminal device that can be operated simultaneously. The capabilities may include number of transmitters for different RATs of the wireless terminal device that can be operated simultaneously. The capabilities may include available receive or transmit features for respective RAT. The receive or transmit features may include transmit bandwidth, receive bandwidth, maximum output power, multiple input-multiple output, MIMO, capacity, beamforming capacity, supported frequency band, decoding rate capacity, encoding rate capacity, or interference mitigation capacity, or any combination thereof.

The determining of the adapted configuration may comprise determining a prioritized transmission and reception action for the multi-connectivity. The prioritized transmission and reception action may comprise selecting RAT to use for transmission and reception based on radio channel characteristics, control signalling, system signalling, latency, reliability, load, peak rate, transmission bandwidth, reception bandwidth, transmit power level, carrier frequency, power efficiency, or established connection, or any combination thereof. The prioritized RAT used for transmission and reception actions, respectively, may be selected separately.

According to a second aspect, there is provided a wireless terminal device of a wireless communication system. The wireless terminal is arranged to operate towards a plurality of radio access technologies, RATs. The wireless terminal device comprises either at least one transmitter and a plurality of receivers for different RATs, or at least one receiver and a plurality of transmitters for the different RATs. The wireless terminal device has capabilities related to the receivers and transmitters, and the wireless terminal device is arranged to receive a configuration from a network node of an access network of the wireless communication system. The configuration is a multi-connectivity configuration arranged to operate according to a plurality of RATs simultaneously. The wireless terminal device further comprises a controller arranged to determine the capabilities of the wireless terminal device, analyse the configuration in view of the capabilities. If the capabilities are fully sufficient for the configuration, the controller is arranged to set the configuration to be used for setting up transceiver operation of the wireless terminal device, and if the capabilities are not fully sufficient for the configuration, the controller is arranged to determine an adapted configuration for setting up the transceiver operation of the wireless terminal device, wherein the capabilities are fully sufficient for the adapted configuration. The controller is further arranged to control operation the wireless terminal device according to selected transceiver operation.

The wireless terminal device may be arranged to, if an adapted configuration is determined, transmit the adapted configuration to the network node.

The capabilities may include number of receivers for different RATs of the wireless terminal device that can be operated simultaneously. The capabilities may include number of transmitters for different RATs of the wireless terminal device that can be operated simultaneously. The capabilities may include available receive or transmit features for respective RAT. The receive or transmit features may include transmit bandwidth, receive bandwidth, maximum output power, multiple input-multiple output, MIMO, capacity, beamforming capacity, supported frequency band, decoding rate capacity, encoding rate capacity, or interference mitigation capacity, or any combination thereof.

The controller may be arranged to determine the adapted configuration by determining a prioritized transmission and reception action for the multi-connectivity. The prioritized transmission and reception action may comprise to select RATs based on radio channel characteristics, control signalling, system signalling, latency, reliability, load, peak rate, transmission bandwidth, reception bandwidth, transmit power level, carrier frequency, power efficiency, or established connection, or any combination thereof. The prioritized transmission and reception actions, respectively, may be selected separately for uplink and downlink.

According to a third aspect, there is provided a computer program comprising instructions which, when executed on a processor of a wireless terminal device, causes the wireless terminal device to perform the method according to the first aspect.

According to a fourth aspect, there is a method of a network node of a wireless communication system for populating a database. The method comprises receiving information about an adapted configuration from a wireless terminal device, in response to a multi-connectivity configuration arranged to operate towards a plurality of RATs simultaneously provided to the wireless terminal device, wherein the adapted configuration is a configuration for which the wireless terminal device has fully sufficient capabilities, and storing information related to the adapted configuration.

The method may further comprise estimating capabilities of the wireless terminal device based on the adapted configuration, wherein the storing of information comprises storing the estimated capabilities.

According to a fifth aspect, there is provided a method of a network node of a wireless communication system for setting a multi-connectivity configuration for a wireless terminal device. The method comprises accessing a database comprising stored information related to adaptations of configurations for the wireless terminal device, setting the multi-connectivity configuration for the wireless terminal device based on accessed information, and transmitting the set multi-connectivity configuration to the wireless terminal device.

The information related to adaptations of configurations for the wireless terminal device may comprise capabilities of the wireless terminal device, wherein the setting of the multi-connectivity configuration for the wireless terminal device is configured such that the multi-connectivity configuration for the wireless terminal device is a configuration for which the wireless terminal device has fully sufficient capabilities.

According to a sixth aspect, there is provided a network node of a wireless communication system configured to populate a database by being configured to receive information about an adapted configuration from a wireless terminal device, in response to a multi-connectivity configuration arranged to operate towards a plurality of RATs simultaneously provided to the wireless terminal device, wherein the adapted configuration is a configuration for which the wireless terminal device has fully sufficient capabilities, and store information related to the adapted configuration.

The network node may further be configured to estimate capabilities of the wireless terminal device based on the adapted configuration, wherein the stored information comprises the estimated capabilities.

According to a seventh aspect, there is provided a network node of a wireless communication system configured to set a multi-connectivity configuration for a wireless terminal device by being configured to access a database comprising stored information related to adaptations of configurations for the wireless terminal device, set the multi-connectivity configuration for the wireless terminal device based on accessed information, and transmit the set multi-connectivity configuration to the wireless terminal device.

The information related to adaptations of configurations for the wireless terminal device may comprise capabilities of the wireless terminal device, wherein the multi-connectivity configuration for the wireless terminal device is configured such that the multi-connectivity configuration for the wireless terminal device is a configuration for which the wireless terminal device has fully sufficient capabilities.

According to an eighth aspect, there is provided a computer program comprising instructions which, when executed on a processor of a network node, causes the network node to perform the method according to any of the fourth and fifth aspects.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

The network scenarios for LTE and NR may be very diverse in terms of coverage and co-location. In terms of deployments, LTE and NR can be co-located, i.e., baseband being implemented in the same physical node, which may be referred to as ideal backhaul, or non-co-located, i.e. baseband implemented in separate physical nodes with non-ideal backhaul.

In the following disclosure, the terms "wireless terminal device", "UE", "wireless device" or in short "device", "terminal", etc. will be used interchangeably. Furthermore, the terms "access network node" or in short "network node" and "NodeB", "eNodeB" or in short "eNB", etc. will also be used interchangeably.

Figure 1:
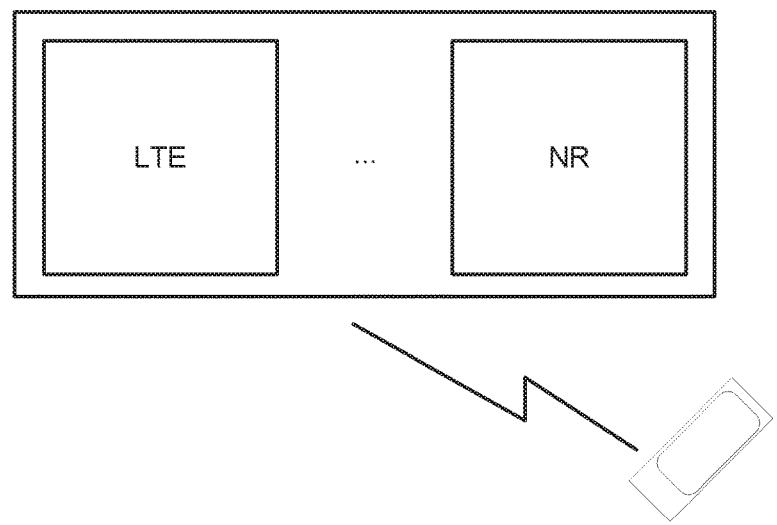
FIG. 1 schematically illustrates a network scenario with co-located network nodes for tight integration of different RATs.
Figure 2:
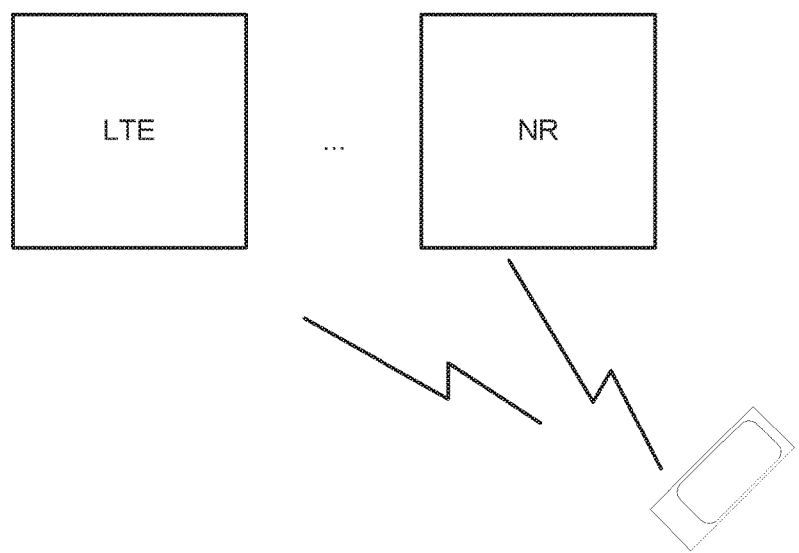
FIG. 2 schematically illustrates a network scenario with separately located network nodes for tight integration of different RATs.

In terms of coverage, LTE and NR may have essentially the same coverage, e.g. in a situation where LTE and NR are deployed co-located and operating in a similar spectrum. This also covers the case where NR may have better coverage than LTE due to the usage of high gain beamforming. Alternatively, NR may be deployed in a high frequency band which would result in a spottier NR coverage compared to LTE. FIG. 1 schematically illustrates a network scenario with co-located network nodes for tight integration of different RATs such as NR and LTE, and FIG. 2 schematically illustrates a network scenario with separately located network nodes for tight integration of the different RATs.

Figure 3:
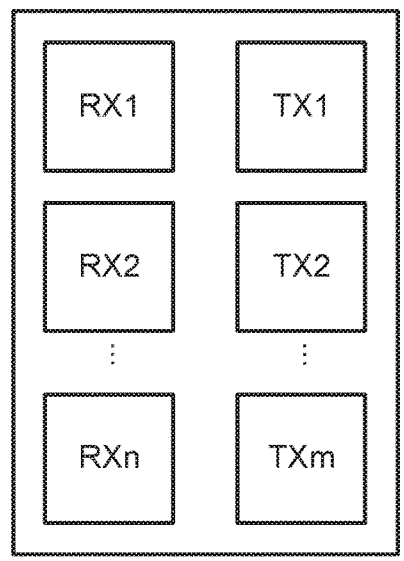
FIG. 3 schematically illustrates a UE with both a plurality of receivers and a plurality of transmitters capable of simultaneous operation towards different RATs.
Figure 4:
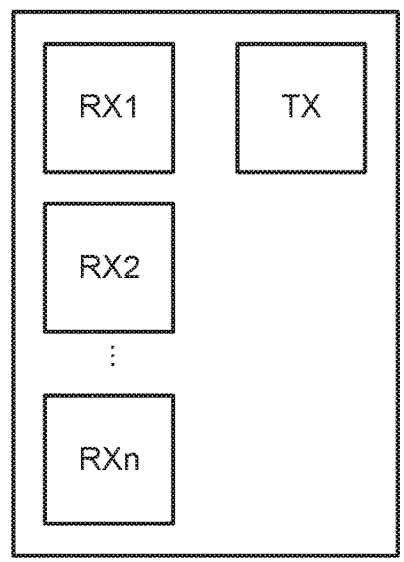
FIG. 4 schematically illustrates a UE with a plurality of receivers capable of simultaneous operation towards different RATs and a transmitter capable of only operating towards one RAT, at least at a time.
Figure 5:
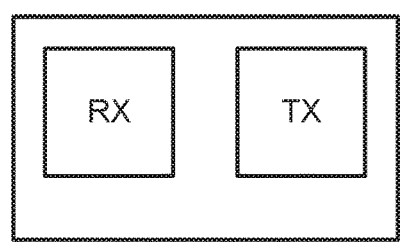
FIG. 5 schematically illustrates a UE with a receiver and a transmitter capable of only operating towards one RAT, at least at a time.

Different UE scenarios may be considered as certain UE types may be limited in the kind of tight integration solutions they support. A characteristic of the different UE types may be the number of receiver chains. It is expected that in 5G timeframe there will be UEs with dual radios, where each radio has both receiver and transmitter (RX/TX) and that these can be operated simultaneously. Such UEs will be able to be fully connected to LTE and NR at the same time without requiring time division operation on lower layers. From a specification point, tight integration will be easiest to specify for this UE type, in the following referred to as UE type #1 and illustrated in FIG. 3. However, from an implementation point of view, two TX chains, i.e. for uplink, operating simultaneously introduces new challenges, including the need to split the limited TX power across the two TXs as well as intermodulation problems might prohibit dual UL TX in certain cases. Thus, there will also be UEs with dual RX but single TX, as these are easier to implement, and these are referred to as UE type #2 and illustrated in FIG. 4. Finally, there will be single-radio low cost UEs capable of both air interfaces, but only one at a time, referred herein to as UE type #3 and illustrated in FIG. 5. The main focus has been on type #1 and type #2 UEs, as type #3 UEs does not benefit as much on the features enabled by the tight integration as demonstrated above.

Even though tight integration of different RATs, such as the LTE and NR, will improve the connectivity for the UE, there may be situations/scenarios where the NW node may misconfigure the UE, for instance it configures the UE with a multi-connectivity feature actually not supported by the UE. The phenomenon that such misconfigurations occur is a well-known observation from earlier generations of mobile networks.

Examples of possible misconfigurations may be that the UE is configured with larger transmission or reception capabilities, e.g. modulation and coding rates, than what is supported by the UE. Another example may be to configure the UE with a larger reception or transmission system bandwidth than supported by the UE.

Another misconfiguration could be related to the assumptions of single vs. dual Tx/Rx at the UE side and the UE capabilities to apply time division multiple (TDM) schemes for the Tx/Rx either in DL or UL. As described above, interworking features may be standardized for Connected state or in a sleeping or low-power state. Within each of the features there can be configurations that depend a lot on UE capabilities. Below we list some of the features and in which ways they would depend on the UE capabilities, for Connected and Sleeping or low-power state(s). For the case of Connected state features, both Control Plane and User Plane features are described, as published in "Tight integration of new 5G air interface and LYE to fulfill 5G requirements", which was presented at IEEE 81$^{st}$ Vehicular Technology Conference 2015.

Figure 10:
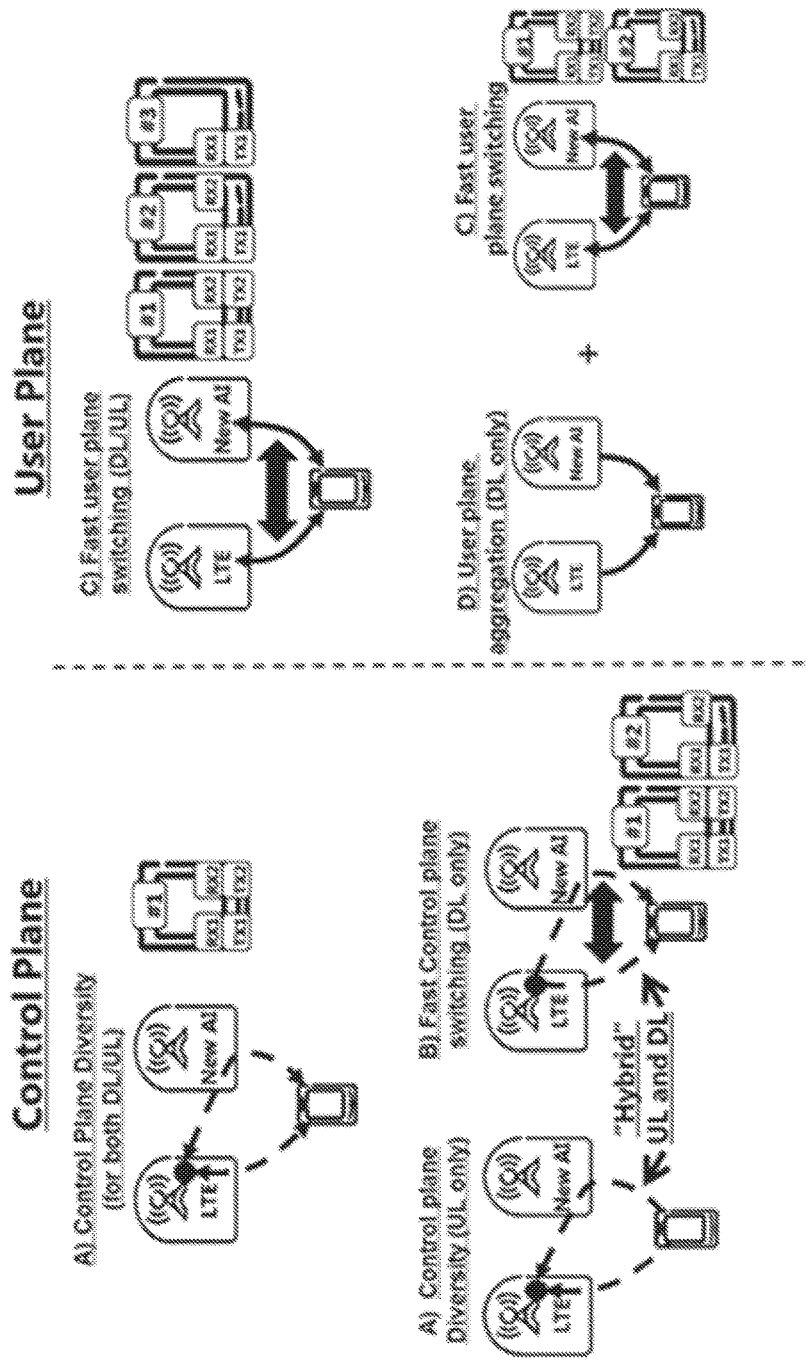
FIG. 10 schematically illustrates interworking features for control plane and user plane in RRC connected state for tight integration of RATs.

FIG. 10 schematically illustrates interworking features for control plane and user plane in RRC connected state for tight integration of RATs. In FIG. 10, the RATs are denoted as the example LTE and "New AI", i.e. new air interface, e.g. NR. Other RATs are equally possible. In FIG. 10, different aspects, denoted as A-D, are illustrated, and will be further discussed below.

Regarding control plane diversity, i.e. A in FIG. 10, RAN2 activities at 3GPP has agreed on a single RRC entity and running RRC state at the UE side when in NR/LTE dual connectivity. In addition, it has also been agreed that either NR or LTE could work as an anchor point i.e. running these RRC specifications. Furthermore, in LTE Rel-12, only one of the links in Dual Connectivity is to send the RRC messages, i.e. the so called Master eNB. However, a discussion in RAN2 activities at 3GPP will likely emanate in considering the possibility to have a Control Plane Diversity support for the NR/LTE tight interworking as a way to improve the mobility robustness as NR would be possibly deployed in frequencies much higher than LTE.

As a consequence, dual-radio UEs, for UL and the DL, could have a single control point for dedicated signalling connected via the two air interfaces. In such a feature, no explicit signalling would be needed to switch link and the receiver is capable of receiving/transmitting any message on any link including the same message simultaneously on both air interfaces. The main benefit of this feature is to provide reliability without the need for explicit signalling to switch air interface, which might be important to fulfil the ultra-reliability requirements for certain applications in the challenging propagation conditions where the connection on one air interface is lost so quickly that no explicit "switch signalling" could have been performed.

Regarding fast control plane switching, i.e. B in FIG. 10, the UE is capable of connecting to a single control point via any of the air interfaces and switch very fast from one link to another, preferably without requiring extensive connection setup signalling. The reliability might not be as high as in the Control Plane Diversity, and additional signalling may be needed compared to the Control Plane Diversity. On the other hand, one advantage is that the solution would work for all UE types.

Considering hybrid control plane (CP) schemes, i.e. A and B in FIG. 10, both CP diversity and Fast CP Switching could have special cases where only DL or UL are configured with each of the modes. In FIG. 10, for example, it is shown a hybrid configuration where CP Diversity is applied in the UL and Fast CP switching for the DL. In other words, the UE has UL configured in both links so that it can transmit without telling the network either via NR, LTE or simultaneously via both. On the other hand, the UE is DL configured to use CP switching i.e. it receives on one link at the time and, in order to change, it needs some RRC signalling. The hybrid scheme would work on dual-Tx/single-Rx UEs or even single-Tx/single-Rx with some TDM scheme in the UL.

Regarding fast user plane switching, i.e. C in FIG. 10, this feature includes that the user plane (UP) for one UE uses only a single air interface at a time, but a fast switching mechanism is provided between them. A robust control plane is required. Apart from providing resource pooling, seamless mobility and reliability, a main advantage is that it applies for UE types #1, #2 and #3, as demonstrated above.

Regarding UP aggregation, i.e. D in FIG. 10, data is transmitted over both air interfaces. Here there will be two variants. One variant of the user plane aggregation is called flow aggregation, which allows a single flow to be aggregated over multiple air interfaces. In another variant, defined as flow routing, a given user data flow is mapped on a single air interface, so different flows of the same UE may be mapped on different air interfaces. The benefits of this feature is increased throughput, pooling of resources and support for seamless mobility. The flow aggregation variant may have limited benefits when the air interfaces provide different latency and throughput. The solution works for UEs of type #1.

Regarding hybrid UP schemes, i.e. C and D of FIG. 10, in the case of the CP, hybrid schemes may also exist for the UP where only DL or UL are configured with each of the modes. In FIG. 10, for example, it is shown a hybrid configuration where UP Aggregation is used in the DL while Fast UP Switching for the UL. That would work with UEs with dual-Tx/dual-Rx but also single-Tx/dual-Rx or even single-Tx/single-Rx with some TDM scheme.

All these different features have different benefits but rely on the UE capabilities in terms of single vs. dual Tx/Rx chains. CP Diversity and aggregation features are in principle limited to dual-Tx/Rx UEs i.e. LIE type#1 as described above. Therefore, UEs of other types can be misconfigured to use the features while they are not dual-Tx/Rx so the following problems may occur:

The network transmits RRC messages and/or UP packets simultaneously over both links but the UE can only receive in one at the time.

The UE transmits RRC messages only at one link at time but the network is always prepared to receive on both links simultaneously The network could in principle only use the feature to switch one or the other but the UE should have been aware of which link is being used which time.

These misconfigurations can lead to problems at the UE but also waste of resources at the network side. Thus, from an end-user perspective, there is a desire that the UE should handle such scenarios where its capabilities mismatch and therefore the method and apparatus demonstrated below provides for approaches for handling such error cases.

In brief, the UE determines a misconfiguration for multi-connectivity applied by the serving/camping NW node(s), not compliant with the actual given UE capability, and based thereon, the UE then determines a proper configuration for setting up transceiver operation that matches the actual device capability, and operates accordingly to replace the misconfigured instruction by the NW node.

With the proposed approach, the UE can maintain basic functionality also in misconfiguration cases related to multi-RAT, e.g. LTE-NR or any other RAT, connectivity, improving the quality of service for the user and potentially avoiding protocol error cases that may lead to additional signalling and delays.

Figure 6:
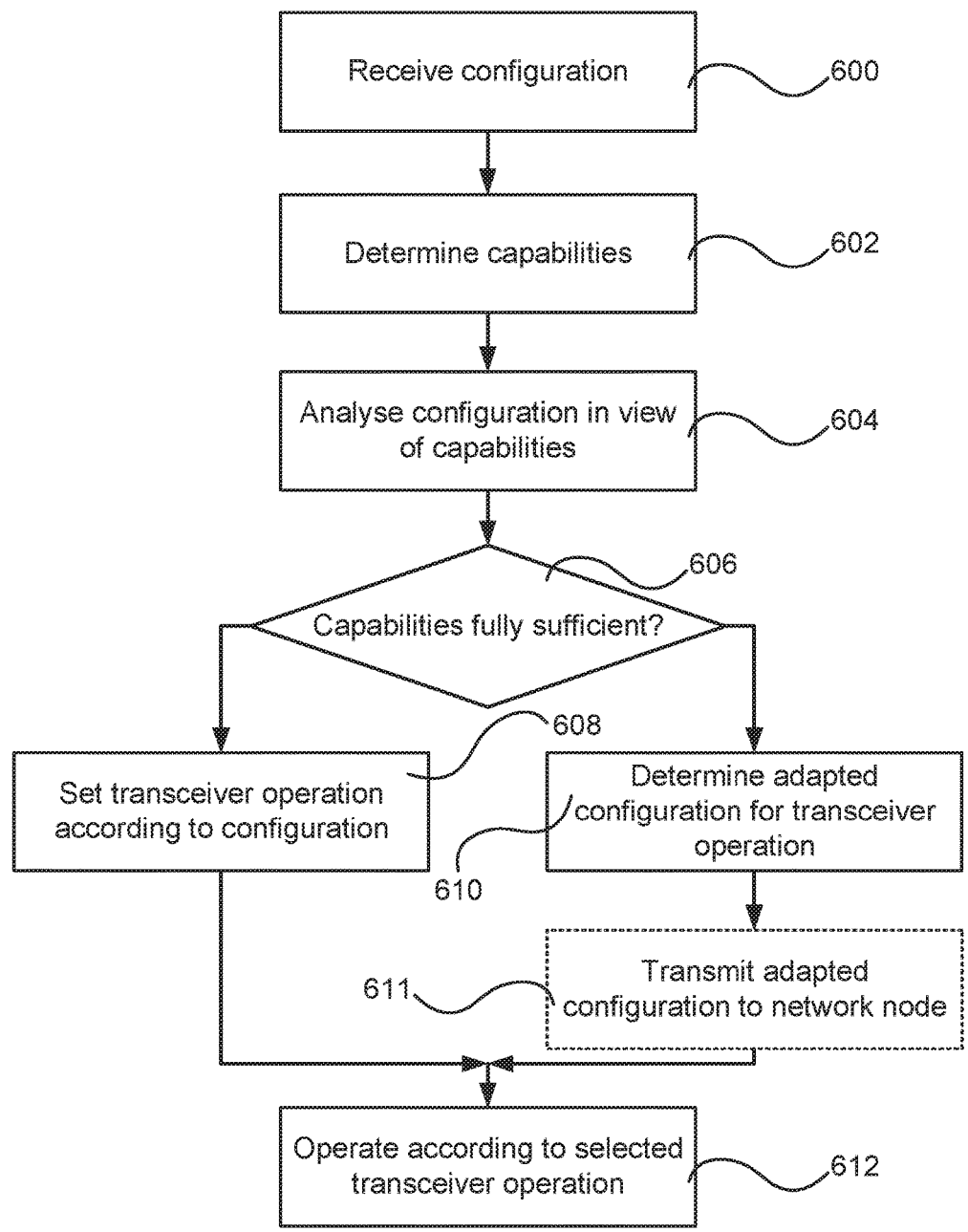
FIG. 6 is a flow chart illustrating a method according to an embodiment.

FIG. 6 is a flow chart illustrating a method according to an embodiment. The method is considered to be performed in a wireless terminal device of a wireless communication system, wherein the wireless terminal is arranged to operate according to a plurality of RATs. The method comprises receiving 600 a configuration from a network node of an access network of the wireless communication system. The configuration is a multi-connectivity configuration arranged to operate towards a plurality of RATs simultaneously. For example, the RATs may comprise LTE and NR, but other combinations of RATs are equally feasible. To spot any misconfiguration the wireless terminal device also determines 602 its capabilities. Based on these findings, the wireless terminal device analyses 604 the received configuration in view of the capabilities. The analysis emanates 606 in that if the capabilities are fully sufficient for the configuration, the configuration is used for setting up 608 transceiver operation of the wireless terminal device, or if the capabilities are not fully sufficient for the configuration, an adapted configuration is determined 610 for setting up the transceiver operation of the wireless terminal device. Here, the adapted configuration is selected such that the capabilities are fully sufficient for the adapted configuration. Optionally, the adapted configuration is transmitted 611 to the network node, which may provide for improved provision of proper configurations by the NW in the future if the NW stores the received information and adapts to it, as will be demonstrated below. The wireless terminal device is now able to operate 612 according to selected transceiver operation since it is clear that this is in line with the capabilities of the wireless terminal device, and proper operation is ascertained.

The above demonstrated approach provides for a match between the selected operation and the capabilities. The capabilities may for example include number of receivers for different RATs which the wireless terminal device can be operate simultaneously, and/or number of transmitters for different RATs which the wireless terminal device can be operate simultaneously. Some RATs may have different levels of demand on capability depending on a mode of operation within the specifications of the RAT. For example, the capabilities of the wireless terminal device may include available receive or transmit features for respective RAT. Example of such receive or transmit features may include transmit bandwidth, receive bandwidth, maximum output power, multiple input-multiple output, MIMO, capacity, beamforming capacity, supported frequency band, decoding rate capacity, encoding rate capacity, interference mitigation capacity, etc. The capabilities may also be any combination of these examples. For example can a combination in practice put demands that are different from the mere aggregation of the features, e.g. some features use shared resources, e.g. processing means and/or storage means, wherein the combination will be tougher for the wireless terminal device than a combination which uses distinct resources.

The determining of the adapted configuration should reasonably comprise finding a good alternative to the received configuration, which may be done by determining a prioritized transmission and reception action for the multi-connectivity. The prioritized transmission and reception action may for example comprise selecting the RAT to use, and where applicable proper operation mode within the specifications for that RAT, for transmission and reception based on for example radio channel characteristics, control signalling, system signalling, latency, reliability, load, peak rate, transmission bandwidth, reception bandwidth, transmit power level, carrier frequency, power efficiency, established connection, etc. The selection may also be made based on any combination of these. The selection may further be done separately or jointly for transmission and reception actions, respectively.

The capability determination, analysis of configuration, and setting and controlling of the transceiver operation as demonstrated above are suitable tasks for a controller, e.g. a module comprising processing means and storage means, and may be implemented as a mix of software and hardware, as will be discussed further below. The controller then interacts with a transmitter and a receiver, or as demonstrated for the different types of UEs above, transmitter(s) and receivers, for performing other parts of the method demonstrated above.

Figure 7:
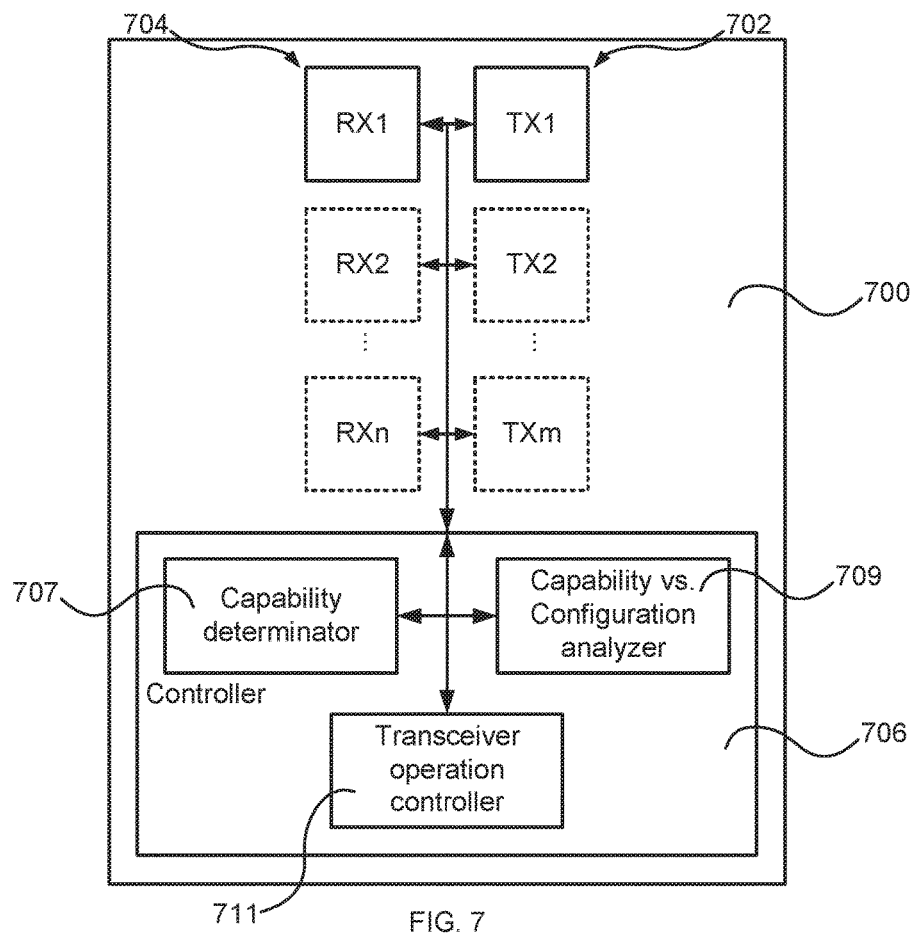
FIG. 7 is a block diagram schematically illustrating a UE according to an embodiment.

FIG. 7 is a block diagram schematically illustrating a wireless terminal device 700 according to an embodiment. The wireless terminal device 700 is arranged to operate in a wireless communication system, e.g. a cellular wireless communication system, and is arranged to operate towards a plurality of RATs, as discussed above. The wireless terminal device 700 can comprise at least one transmitter 702 and a plurality of receivers 704 for different RATs, or at least one receiver 704 and a plurality of transmitters 702 for the different RATs, as has been discussed above with reference to different types of UEs. The wireless terminal device 700 has capabilities related to the receivers and transmitters, for example as discussed above. Further, the wireless terminal device 700 is arranged to receive a configuration from a network node of an access network of the wireless communication system, wherein the configuration is a multi-connectivity configuration arranged to operate according to a plurality of RATs simultaneously. Thus, the capabilities affect the ability to operate according to the provided configuration. The wireless terminal device 700 comprises a controller 706 arranged to interact with the receiver(s) 704 and transmitter(s) 702. The controller is arranged to determine the capabilities of the wireless terminal device, e.g. by a capability determinator 707, analyse the configuration in view of the capabilities, e.g. by a capability vs. configuration analyser 709. The controller is thus capable of judging whether the capabilities are fully sufficient for the configuration or the capabilities are not fully sufficient for the configuration. Based on this judgement, the controller is arranged to, e.g. by a transceiver operation controller 711, set up a proper transceiver operation which enables the wireless terminal device 700 to operate. Thus, the controller 706 is arranged to set the configuration to be used for setting up transceiver operation of the wireless terminal device 700 when it has determined that the capabilities are fully sufficient for the configuration, or if the capabilities are not fully sufficient for the configuration, determine an adapted configuration for setting up the transceiver operation of the wireless terminal device 700, wherein the capabilities are fully sufficient for the adapted configuration. The controller 706 is thus enabled to control operation the wireless terminal device 700, e.g. by the transceiver operation controller 711, according to selected transceiver operation, wherein the transeiver(s) 702 and receiver(s) 704 will operate accordingly.

Optionally, the wireless terminal device 700 is arranged to, if an adapted configuration is determined by the controller 706, transmit the adapted configuration to the network node, e.g. by the transmitter(s) 702 under control of the controller 706. The controller 706 may be arranged to determine the adapted configuration by determining a prioritized transmission and reception action for the multi-connectivity as demonstrated above. The capabilities considered here may be as discussed above.

Figure 8:
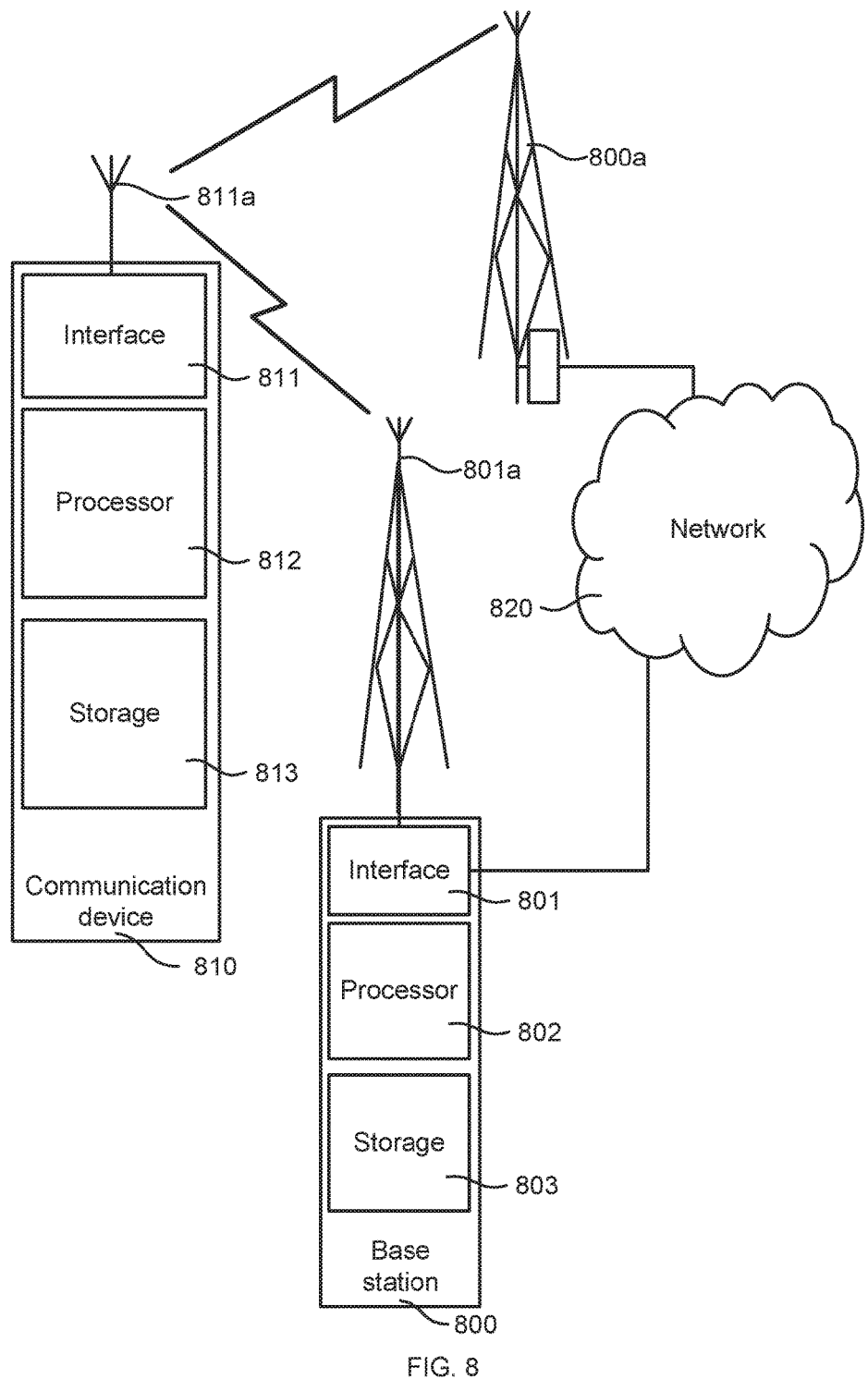
FIG. 8 schematically illustrates a wireless communication system.

FIG. 8 schematically illustrates a wireless communication system. FIG. 8 illustrates a cellular wireless network comprising a view of an access network node 800 and a wireless terminal device 810, in accordance with a particular embodiment. For simplicity, FIG. 8 only depicts network 820, access network nodes 800 and 800a, and wireless terminal device 810. Access network node 800 comprises processor 802, storage 803, interface 801, and antenna set 801a. Similarly, the wireless terminal device 810 comprises processor 812, storage 813, interface 811 and antenna set 811a. These components may work together in order to provide access network node and/or wireless device functionality. In different embodiments, the wireless network may comprise any number of wired or wireless networks, access network nodes, base stations, controllers, wireless devices, relay stations, and/or any other components that may facilitate or participate in the communication of data and/or signals whether via wired or wireless connections. In particular, the wireless network is arranged to apply tight integration as discussed above, e.g. with reference to FIGS. 1 and 2. For the sake of a clearer view, since the purpose of FIG. 8 is to illustrate an overview of the network, the co-location and divided location of network nodes for the multiple RATs is not shown here.

Network 820 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Access network node 800 comprises processor 802, storage 803, interface 801, and antenna set 801*a*. These components are depicted as single boxes located within a single larger box. In practice however, an access network node may comprise multiple different physical components that make up a single illustrated component (e.g., interface 801 may comprise terminals for coupling wires for a wired connection and a radio transceiver for a wireless connection). Similarly, access network node 800 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. In certain scenarios in which access network node 800 comprises multiple separate components (e.g., BTS and BSC components), one or more of the separate components may be shared among several access network nodes. For example, a single RNC may control multiple NodeB's. In such a scenario, each unique NodeB and BSC pair, may be a separate access network node. In some embodiments, access network node 800 may be configured to support multiple radio access technologies (RATs). In such embodiments, some components may be duplicated (e.g., separate storage 803 for the different RATs) and some components may be reused (e.g., the same antenna set 801*a* may be shared by the RATs).

Processor 802 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other access network node 800 components, such as storage 803, access network node 800 functionality. For example, processor 802 may execute instructions stored in storage 803. Such functionality may include providing various wireless features discussed herein to a wireless terminal device, such as wireless terminal device 810, including any of the features or benefits disclosed herein.

Storage 803 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 803 may store any suitable instructions, data or information, including software and encoded logic, utilized by access network node 800. Storage 803 may be used to store any calculations made by processor 802 and/or any data received via interface 801.

Access network node 800 also comprises interface 801 which may be used in the wired or wireless communication of signalling and/or data between access network node 800, network 820, and/or wireless terminal device 810. For example, interface 801 may perform any formatting, coding, or translating that may be needed to allow access network node 800 to send and receive data from network 820 over a wired connection. Interface 801 may also include a radio transmitter and/or receiver that may be coupled to or a part of antenna set 801*a*. The radio may receive digital data that is to be sent out to other access network nodes or wireless terminal devices via a wireless connection. The radio may convert the digital data into a radio signal having the appropriate channel and bandwidth parameters. The radio signal may then be transmitted via antenna set 801*a* to the appropriate recipient (e.g., wireless terminal device 810).

Antenna set 801*a* may be any type of antenna capable of transmitting and receiving data and/or signals wirelessly. Here, the antenna set 801*a* is to be considered as a plurality of antennas such that multi-rank transmissions are enabled. In some embodiments, antenna set 801*a* may comprise two or more omnidirectional, sector or panel antennas operable to transmit/receive radio signals between, for example, 700 MHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The wireless terminal device 810 may be any type of communication device, wireless device, UE, D2D device or ProSe (Proximity Service) UE capable of multi-RAT operation, but may in general be any device, sensor, actuator, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine-to-machine (M2M) communication, etc., which is able to wirelessly send and receive data and/or signals to and from a access network node, such as access network node 800 and/or other wireless terminal devices. The wireless terminal device 810 comprises processor 812, storage 813, interface 811, and antenna 811*a*. Like access network node 800, the components of wireless terminal device 810 are depicted as single boxes located within a single larger box, however in practice a wireless device may comprise multiple different physical components that make up a single illustrated component (e.g., storage 813 may comprise multiple discrete microchips, each microchip representing a portion of the total storage capacity).

Processor 812 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless terminal device 810 components, such as storage 813, wireless terminal device 810 functionality. Such functionality may include providing various wireless features discussed herein, including any of the features or benefits disclosed herein.

Storage 813 may be any form of volatile or non-volatile memory including, without limitation, persistent storage, solid state memory, remotely mounted memory, magnetic media, optical media, RAM, ROM, removable media, or any other suitable local or remote memory component. Storage 813 may store any suitable data, instructions, or information, including software and encoded logic, utilized by wireless terminal device 810. Storage 813 may be used to store any calculations made by processor 812 and/or any data received via interface 811.

Interface 811 may be used in the wireless communication of signalling and/or data between wireless terminal device 810 and access network node 800. For example, interface 811 may perform any formatting, coding, or translating that may be needed to allow wireless terminal device 810 to send and receive data from access network node 800 over a wireless connection. Interface 811 may also include a radio transmitter and/or receiver that may be coupled to or a part of antenna 811a. The radio may receive digital data that is to be sent out to access network node 801 via a wireless connection. The radio may convert the digital data into a radio signal having the appropriate channel and bandwidth parameters. The radio signal may then be transmitted via antenna 811a to access network node 800.

Antenna 811a may be any type of antenna capable of transmitting and receiving data and/or signals wirelessly. In some embodiments, antenna 811a may comprise one or more omnidirectional, sector or panel antennas operable to transmit/receive radio signals between 2 GHz and 66 GHz. For simplicity, antenna 811a may be considered a part of interface 811 to the extent that a wireless signal is being used.

In particular, the interface 811 may be configured according to any of the UE types demonstrated above, and the processor 812 may implement the controller, at least partially, demonstrated with reference to FIG. 7, wherein the interface 811 and the processor 812, possibly with aid of the storage 813, are arranged to perform the approach demonstrated with reference to FIG. 6.

In some embodiments, the components described above may be used to implement one or more functional modules used for the multi-RAT operation. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 812 and/or 802, possibly in cooperation with storage 813 and/or 803. Processors 812 and/or 802 and storage 813 and/or 803 may thus be arranged to allow processors 812 and/or 802 to fetch instructions from storage 813 and/or 803 and execute the fetched instructions to allow the respective functional module to perform any features or functions disclosed herein. The modules may further be configured to perform other functions or steps not explicitly described herein but which would be within the knowledge of a person skilled in the art.

For the optional feature of the wireless terminal device reporting the adapted configuration, i.e. information about the adapted configuration is transmitted 611 to the network node, the network node may be configured to receive the information about the adapted configuration through the interface 801. The NW node then provides for storage of information related to the adapted configuration, possibly together with other information such as the information about the original configuration and/or information on which the decision about the original configuration was based. The storing may be made internally, i.e. on storage 803, or externally, e.g. in a node in or connected to the network 820. The stored information, e.g. forming a database together with stored information from other occasions, may be used for improved provision of proper configurations by the NW node in the future wherein the NW node is arranged to access the stored information and adapt to it at another occasion.

Thus, a method of the NW node may comprise receiving 1100 information about an adapted configuration from the wireless terminal device, and storing 1102 information related to the adapted configuration, e.g. the received information and/or information related to the original configuration as demonstrated above. Optionally, the method comprises estimating 1101 capabilities of the wireless terminal device based on the adapted configuration and e.g. the information related to the original configuration as demonstrated above. For example, boundaries of the capabilities may be determined from that the wireless terminal device cannot operate according to the original configuration but is capable of operating according to the adapted configuration.

A further method of the NW node may comprise accessing 1200 stored information regarding adapted configuration or capabilities of a wireless terminal device. Here it should be noted that it is not necessary that the information is stored by the same NW node; The accessing NW node may benefit from information stored by other NW nodes. Based on the accessed information, the NW node may set 1202 a suitable configuration for a wireless terminal device and provide 1204 the set configuration to the wireless terminal device by transmitting the configuration to the wireless terminal device.

Both the methods above may be performed by the NW node, i.e. the NW node may both have the capability to populate e.g. a database, and access stored information for provision of proper configuration for a specific wireless terminal.

Figure 9:
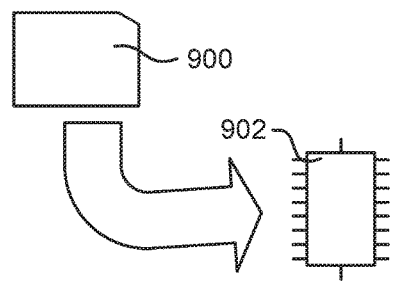
FIG. 9 schematically illustrates a computer-readable medium and a processing device.
Figure 11:
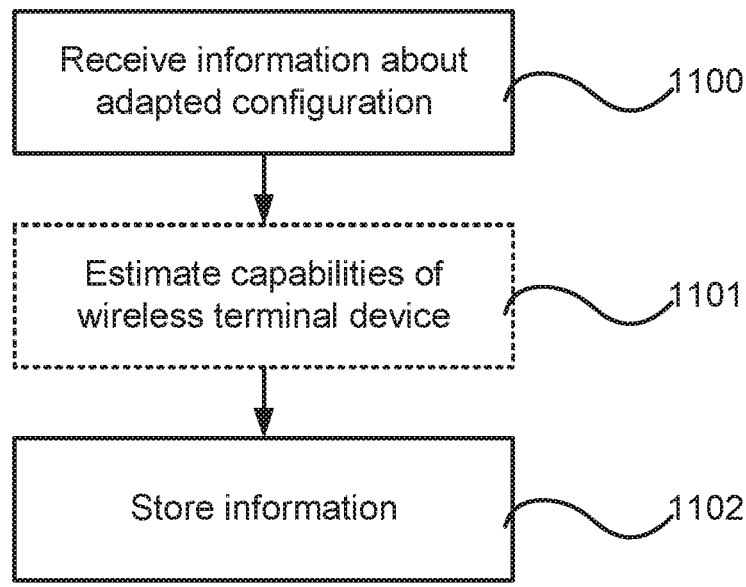
FIG. 11 is a flow chart schematically illustrating a method of a network node for populating a database.
Figure 12:
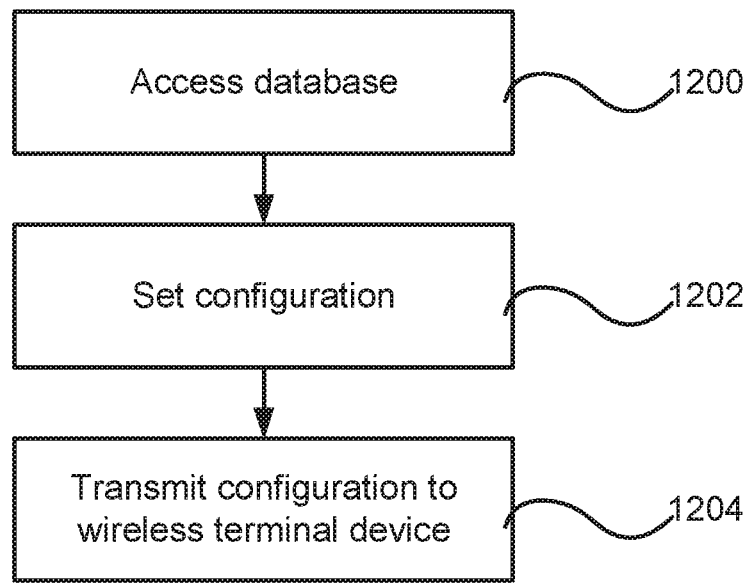
FIG. 12 is a flow chart schematically illustrating a method of a network node for setting a multi-connectivity configuration for a wireless terminal device

The methods according to the present invention is suitable for implementation with aid of processing means, such as computers and/or processors, especially for the case where the controller demonstrated above comprises a processor handling e.g. acquiring of configuration, the determination of capabilities, analysis of received configuration in view of the capabilities, and setting and controlling of transceiver operation. Similar applies for the NW node where processing and memory means provides for the approaches demonstrated above. Therefore, there is provided computer programs, comprising instructions arranged to cause the processing means, processor, or computer to perform the steps of any of the methods according to any of the embodiments described with reference to FIGS. 6, 11 and 12. The computer programs preferably comprises program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to FIGS. 6, 11 and 12. The computer 902 and computer program product 900 can be arranged to execute the program code sequentially where actions of the any of the methods are performed stepwise, and performing actions on a real-time basis where suitable. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as arty direct illustration of the elements.

Note that although terminology from 3GPP context, such as LTE/NR, has been used in this disclosure to exemplify the approach, this should not be seen as limiting the scope to only the aforementioned systems. Other wireless systems may also benefit from exploiting the approaches covered within this disclosure. Also note that terminologies such as serving NW node and UE should be considered non-limiting and does in particular not imply a certain hierarchical relation between the two; in general "serving NW node" could be considered as a first entity and "UE" could be considered as a second entity and these two entities communicate with each other over some radio channel.

The invention claimed is:

1. A method performed by a wireless terminal device configured for operation in a wireless communication system providing multi-connectivity for the wireless terminal device via two or more different Radio Access Technologies (RATs), the method comprising:
receiving information from a network node of the wireless communication system, the information indicating a multi-connectivity configuration proposed by the wireless communication system for operation of the wireless terminal device regarding the two or more RATs;
determining whether the proposed multi-connectivity configuration complies with multi-connectivity capabilities of the wireless terminal device;
when the proposed multi-connectivity configuration complies with the multi-connectivity capabilities of the wireless terminal device, adopting the proposed multi-connectivity configuration as an operating configuration of the wireless terminal device; and
when the proposed multi-connectivity configuration does not comply with the multi-connectivity capabilities of the wireless terminal device:
adapting one or more parameters of the proposed multi-connectivity configuration, to obtain an adapted multi-connectivity configuration that complies with the multi-connectivity capabilities of the wireless terminal device, and adopting the adapted multi-connectivity as the operating configuration of the wireless terminal device; and
transmitting, for the network node, an indication of the adaptations made to the proposed multi-connectivity configuration, thereby providing the network node with information about the non-compliance of the proposed multi-connectivity configuration with the multi-connectivity capabilities of the wireless terminal device.

2. The method of claim 1, wherein adopting the proposed or adapted multi-connectivity configuration comprises configuring transceiver operation of the wireless terminal device according to one or more transceiver settings or parameters comprising the proposed or adapted multi-connectivity configuration.

3. The method of claim 1, wherein transmitting the indication of the adaptations made to the proposed multi-connectivity configuration comprises transmitting information comprising or identifying the adapted multi-connectivity configuration.

4. The method of claim 1, wherein the proposed multi-connectivity configuration specifies simultaneous multi-RAT transmission or reception by the wireless terminal device, wherein determining whether the proposed multi-connectivity configuration complies with the multi-connectivity capabilities of the wireless terminal device comprises determining whether the wireless terminal device supports the specified simultaneous multi-RAT transmission or reception, and, wherein, when the wireless terminal device does not support the specified simultaneous multi-RAT reception or transmission, adapting the one or more parameters of the proposed multi-connectivity configuration comprises determining a prioritized reception or transmission configuration to be used by the wireless terminal device with respect to the two or more RATs, for performing prioritized reception or transmission on one of the two or more RATs in lieu of the specified simultaneous reception or transmission.

5. A wireless terminal device configured for operation in a wireless communication system providing multi-connectivity for the wireless terminal device via two or more different Radio Access Technologies (RATs), the wireless terminal device comprising:
transceiver circuitry configured for wireless communication according to each of the two or more RATs; and
processing circuitry operatively associated with the transceiver circuitry and configured to:
receive information from a network node of the wireless communication system, the information indicating a multi-connectivity configuration proposed by the wireless communication system for operation of the wireless terminal device regarding the two or more RATs;
determine whether the proposed multi-connectivity configuration complies with multi-connectivity capabilities of the wireless terminal device;
when the proposed multi-connectivity configuration complies with the multi-connectivity capabilities of the wireless terminal device, adopt the proposed multi-connectivity configuration as an operating configuration of the wireless terminal device; and
when the proposed multi-connectivity configuration does not comply with the multi-connectivity capabilities of the wireless terminal device:
adapt one or more parameters of the proposed multi-connectivity configuration, to obtain an adapted multi-connectivity configuration that complies with the multi-connectivity capabilities of the wireless terminal device;
adopt the adapted multi-connectivity as the operating configuration of the wireless terminal device; and
transmit, for the network node, an indication of the adaptations made to the proposed multi-connectivity configuration, thereby providing the network node with information about the non-compliance of the proposed multi-connectivity configuration with the multi-connectivity capabilities of the wireless terminal device.

6. The wireless terminal device of claim 5, wherein the processing circuitry is configured to adopt the proposed or adapted multi-connectivity configuration by configuring operation of the transceiver circuitry according to one or more transceiver settings or parameters comprising the proposed or adapted multi-connectivity configuration.

7. The wireless terminal device of claim 5, wherein, for transmitting the indication of the adaptations made to the proposed multi-connectivity configuration, the processing circuitry is configured to transmit, via the transceiver circuitry, information comprising or identifying the adapted multi-connectivity configuration.

8. The wireless terminal device of claim 5, wherein the proposed multi-connectivity configuration specifies simultaneous multi-RAT transmission or reception by the wireless terminal device, wherein, to determine whether the proposed multi-connectivity configuration complies with the multi-connectivity capabilities of the wireless terminal device, the processing circuitry is configured to determine whether the transceiver circuitry supports the specified simultaneous multi-RAT transmission or reception, and, wherein, when the wireless terminal device does not support the specified simultaneous multi-RAT reception or transmission, the processing circuitry is configured to adapt the one or more parameters of the proposed multi-connectivity configuration by determining a prioritized reception or transmission configuration to be used by the transceiver circuitry with respect to the two or more RATs, for performing prioritized reception or transmission on one of the two or more RATs in lieu of the specified simultaneous reception or transmission.

9. A method performed by a network node of a wireless communication system that provides multi-connectivity for a wireless terminal device via two or more different Radio Access Technologies (RATs), the method comprising:
proposing a multi-connectivity configuration to be used by the wireless terminal device for multi-connectivity operation of the wireless terminal device regarding the two or more RATs;
receiving return information from the wireless terminal device indicating one or more adaptations made by the wireless terminal device to the proposed multi-connectivity configuration, for compliance with multi-connectivity capabilities of the wireless terminal device; and
using the returned information, or capability information derived therefrom, when proposing a new or updated multi-connectivity configuration for the wireless terminal device, the new or updated multi-connectivity configuration being compliant with one or more multi-connectivity capabilities of the wireless terminal device determined from the returned information.

10. A network node configured for operation in a wireless communication system that provides multi-connectivity for a wireless terminal device via two or more different Radio Access Technologies (RATs), the network node comprising:
communication circuitry configured for communicating directly or indirectly with the wireless terminal device; and
processing circuitry operatively associated with the communication circuitry and configured to:
propose a multi-connectivity configuration to be used by the wireless terminal device for multi-connectivity operation of the wireless terminal device regarding the two or more RATs;
receive return information from the wireless terminal device indicating one or more adaptations made by the wireless terminal device to the proposed multi-connectivity configuration, for compliance with multi-connectivity capabilities of the wireless terminal device; and
use the returned information, or capability information derived therefrom, when proposing a new or updated multi-connectivity configuration for the wireless terminal device, the new or updated multi-connectivity configuration being compliant with one or more multi-connectivity capabilities of the wireless terminal device determined from the returned information.

* * * * *